(12) United States Patent  
Newlin et al.

(10) Patent No.: US 7,726,182 B1
(45) Date of Patent: Jun. 1, 2010

(54) ENGINE TEST STAND ASSEMBLY

(76) Inventors: Mark A. Newlin, 729 W. 4th St., Concordia, KS (US) 66901; Lance Newlin, 729 W. 4th St., Concordia, KS (US) 66901

( * ) Notice: Subject to any disclaimer, the term of this patent is extended or adjusted under 35 U.S.C. 154(b) by 0 days.

(21) Appl. No.: 12/345,819

(22) Filed: Dec. 30, 2008

(51) Int. Cl.
 *G01M 15/02* (2006.01)
(52) U.S. Cl. ................... 73/116.02; 73/116.01
(58) Field of Classification Search ........... 73/116.02, 73/116.05
 See application file for complete search history.

(56) References Cited

U.S. PATENT DOCUMENTS

| | | | |
|---|---|---|---|
| 1,614,697 A | | 1/1927 | Snook |
| 2,991,649 A | * | 7/1961 | Kinsey .................. 73/116.02 |
| 3,765,667 A | * | 10/1973 | Christiansen ............. 269/59 |
| 4,174,627 A | * | 11/1979 | Swis et al. ............. 73/116.02 |
| 4,516,308 A | | 5/1985 | Urban |
| 4,560,151 A | * | 12/1985 | Grundy .................... 269/17 |
| 4,770,304 A | | 9/1988 | Woods |
| 4,846,451 A | * | 7/1989 | Squier .................... 269/17 |
| 4,932,628 A | * | 6/1990 | Pacheco ................. 248/676 |
| 5,261,640 A | | 11/1993 | Yuan |
| 5,375,963 A | | 12/1994 | Wohlwend |
| 5,851,007 A | * | 12/1998 | Swartzlander et al. ....... 269/17 |
| 5,897,101 A | | 4/1999 | Snyder |
| 5,934,490 A | | 8/1999 | Mora |
| 6,164,625 A | | 12/2000 | Shockley et al. |
| 6,253,600 B1 | * | 7/2001 | Sondey ................. 73/116.02 |
| D465,635 S | | 11/2002 | Hong |
| 6,591,665 B2 | * | 7/2003 | Sondey ................. 73/116.02 |
| 7,237,758 B2 | | 7/2007 | Nikolic |
| 7,581,713 B1 | * | 9/2009 | Voss ...................... 254/2 R |
| 2003/0062663 A1 | * | 4/2003 | Fox ......................... 269/17 |
| 2006/0113435 A1 | * | 6/2006 | Nikolic ................. 248/122.1 |

* cited by examiner

*Primary Examiner*—Lisa M Caputo
*Assistant Examiner*—Freddie Kirkland, III

(57) ABSTRACT

An engine test stand assembly includes an elongated front support having a pair of coupling sleeves mounted thereon. The coupling sleeves are coupled to a pair of elongated lateral supports. A pair of receiving members is positioned on the front support to receive ends of an engine hoist to stabilize the hoist with respect to the front support. Each of the lateral supports has one of a pair of vertical mounts attached thereto. The vertical mounts support post members to secure the post members to an associated one of the lateral supports. A pair of engine supports each includes a top end and bottom end. The bottom ends engage the front support and the top ends of the engine supports are abuttable against an engine to hold the engine above the front support. A pair of lower supports mounted on the post members is engageable with the engine.

7 Claims, 6 Drawing Sheets

ENGINE TEST STAND ASSEMBLY

FIELD OF THE DISCLOSURE

The disclosure relates to engine support devices and more particularly pertains to a new engine support device for supporting an engine coupled to an engine hoist to allow the engine to be run and tested.

SUMMARY OF THE DISCLOSURE

An embodiment of the disclosure meets the needs presented above by generally comprising an elongated and horizontally orientated front support has a pair of opposite ends. A pair of coupling sleeves is mounted on the front support. A pair of elongated and horizontally orientated lateral supports is provided. Each of the lateral supports has a first end and a second end. The coupling sleeves each receive one of the first ends of the lateral supports. A pair of receiving members is positioned on the front support. Ends of an engine hoist are extendable into the receiving members to stabilize the hoist with respect to the front support. A pair of vertical mounts is also provided. Each of the second ends has one of the vertical mounts attached thereto. Post members are positioned in the vertical mounts to secure the post members to an associated one of the lateral supports. A pair of engine supports each includes a top end and bottom end. The bottom ends engage the front support and the top ends of the engine supports are abuttable against an engine to hold the engine above the front support. A pair of lower supports is mounted on the post members. Each of the lower supports includes a flange engageable with the engine or a radiator on the engine.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
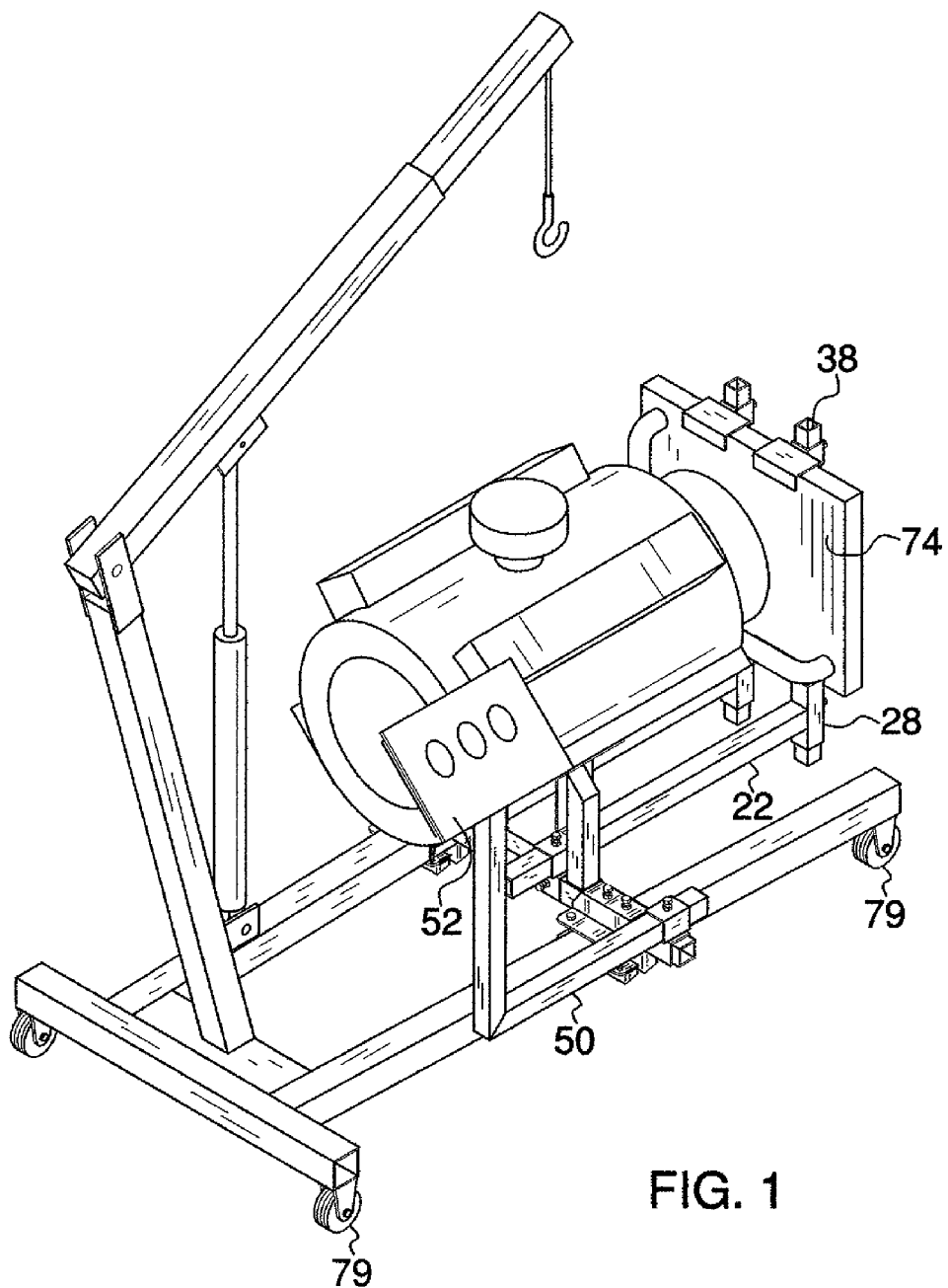
FIG. 1 is an in-use top perspective view of a engine test stand assembly according to an embodiment of the disclosure.
Figure 2:
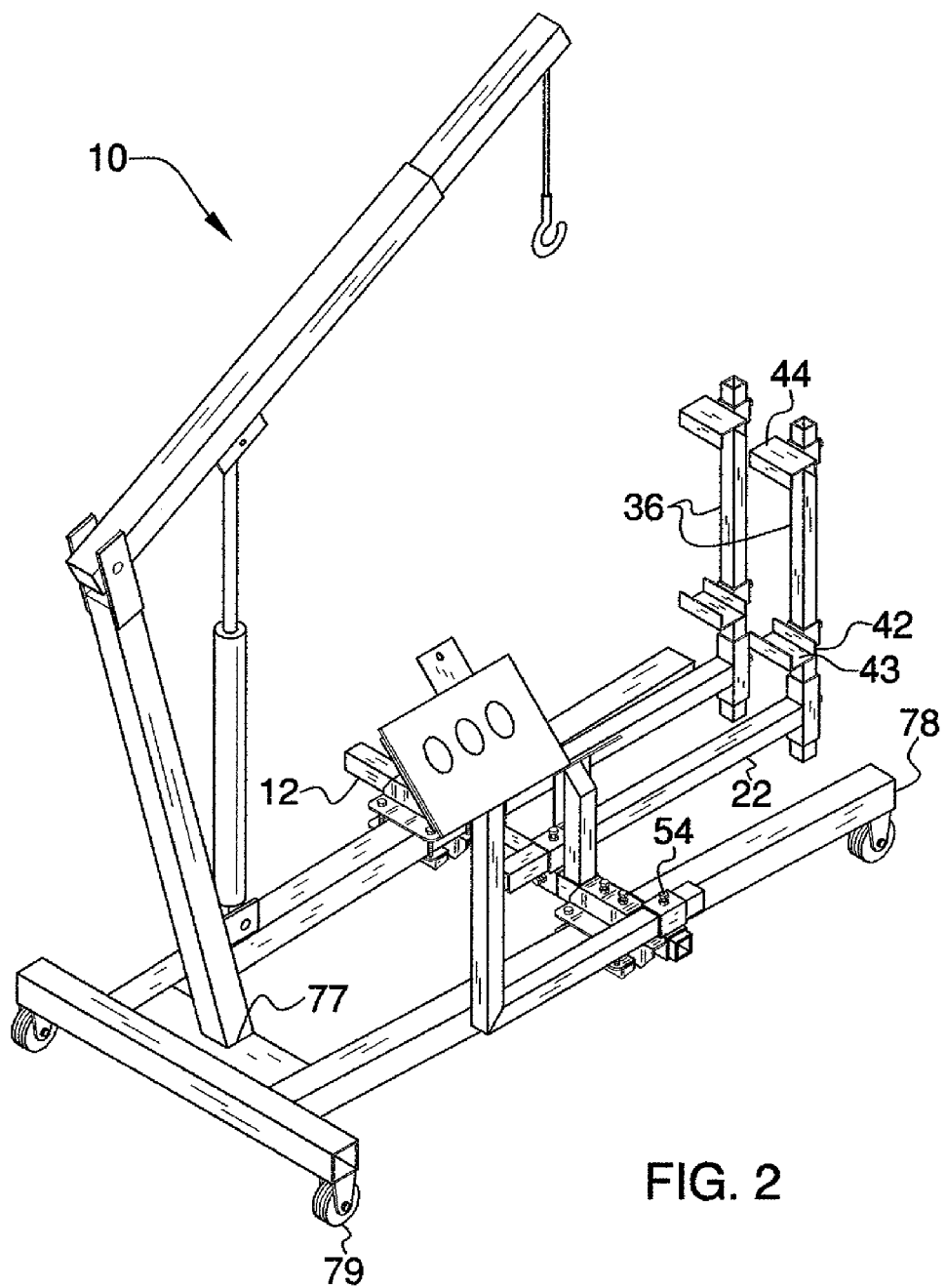
FIG. 2 is a top perspective view of an embodiment of the disclosure.
Figure 3:
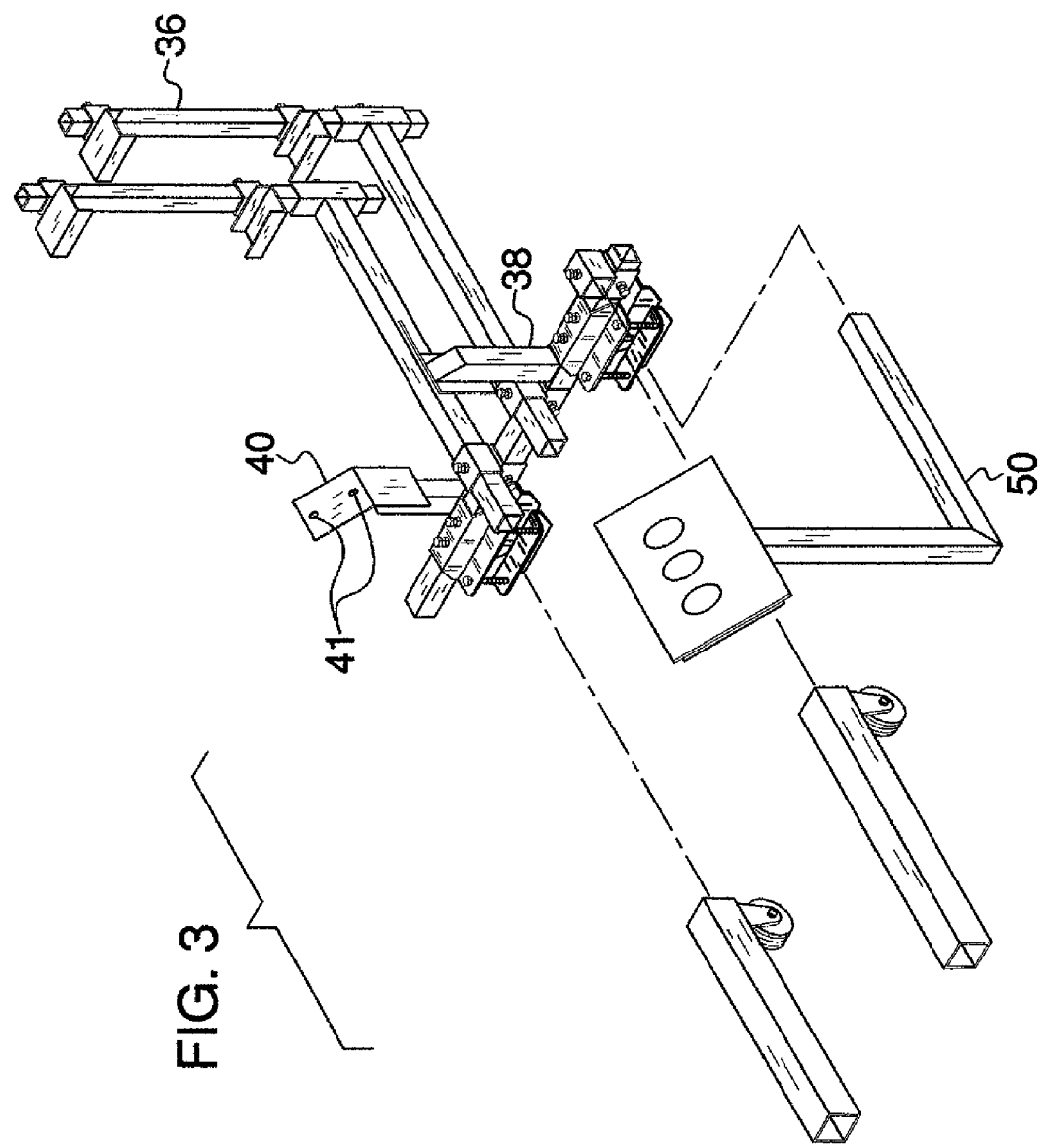
FIG. 3 is a top perspective view of an embodiment of the disclosure.
Figure 4:
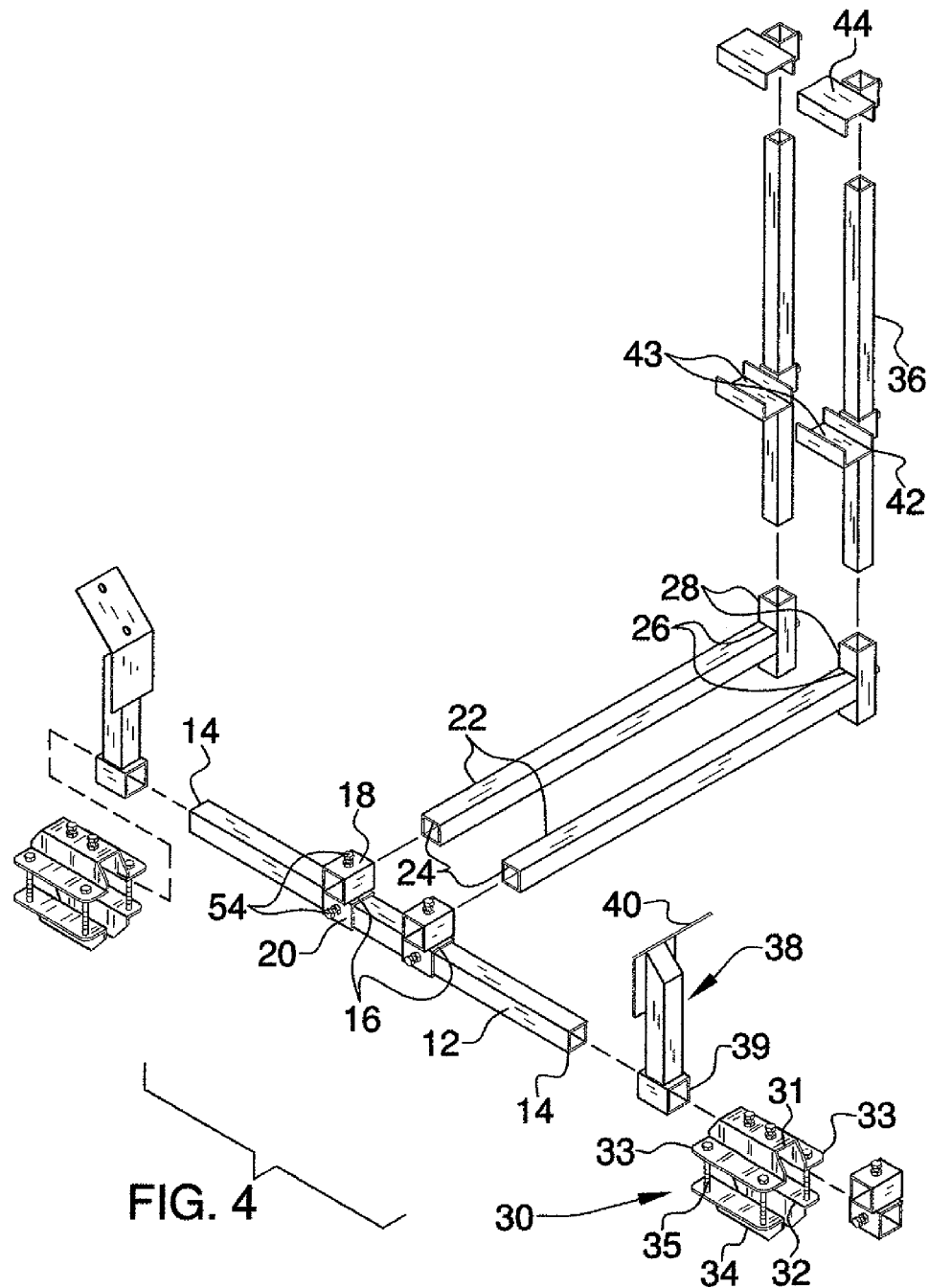
FIG. 4 is an expanded perspective view of an embodiment of the disclosure.

With reference now to the drawings, and in particular to FIGS. 1 through 6 thereof, a new engine support device embodying the principles and concepts of an embodiment of the disclosure and generally designated by the reference numeral 10 will be described.

As best illustrated in FIGS. 1 through 6, the engine test stand assembly 10 generally comprises an elongated and horizontally orientated front support 12 that has a pair of opposite ends 14. A pair of coupling sleeves 16 is mounted on the front support 12. Each of the coupling sleeves 16 includes a sleeve portion 18 and a coupler portion 20. The sleeve portions 18 are positioned above the front support 12. The coupler portions 20 are selectively positioned on the front support 12 to allow a distance between the coupling sleeves 16 to be adjusted.

A pair of elongated and horizontally orientated lateral supports 22 is provided. Each of the lateral supports 22 has a first end 24 and a second end 26. Each of the coupling sleeves 16 receives one of the first ends 24 to align the lateral supports 22 parallel with each other and perpendicular to the front support 12. A distance from the second ends 26 to the front support 12 is selectively adjustable. A pair of vertical mounts 28 is provided. Each of the second ends 26 has one of the vertical mounts 28 attached thereto. The vertical mounts 28 each comprise a tube.

Figure 5:
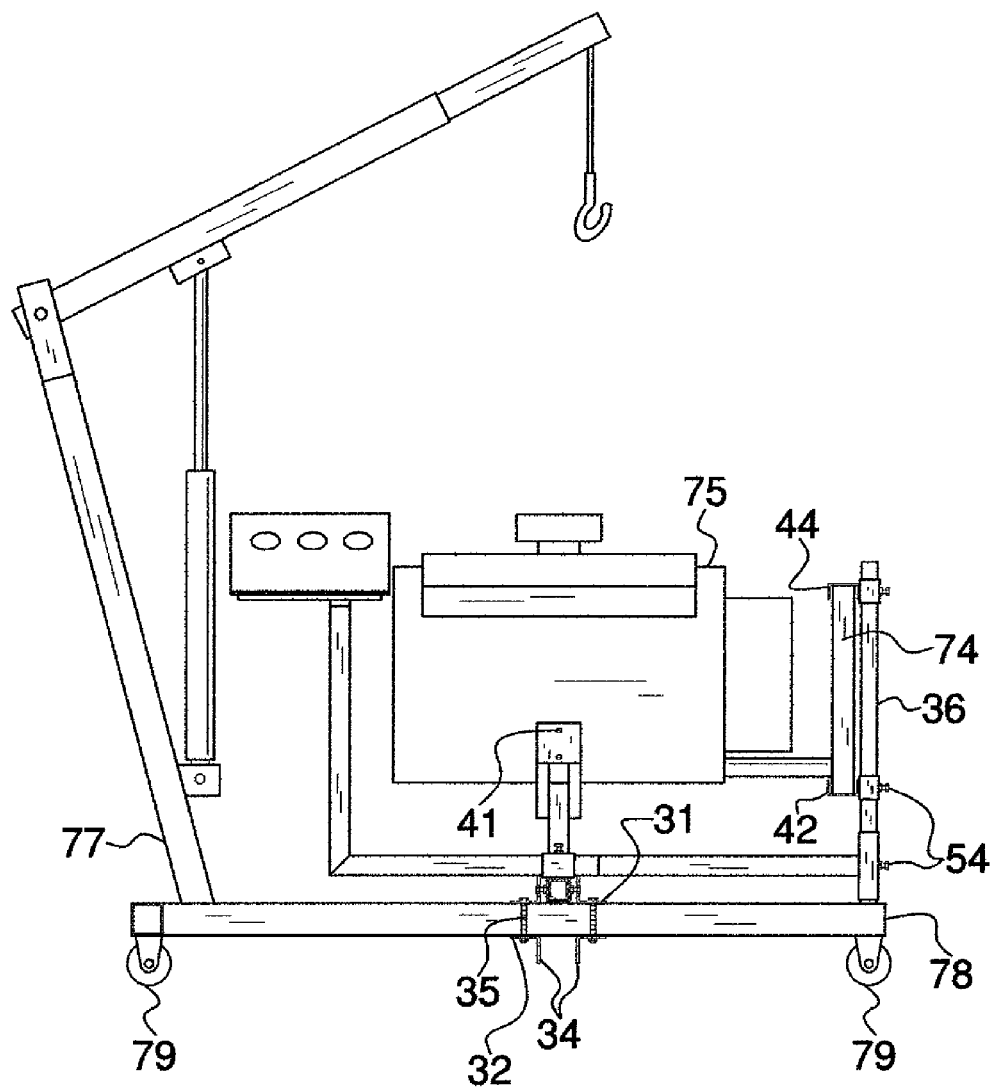
FIG. 5 is a side in-use view of an embodiment of the disclosure.
Figure 6:
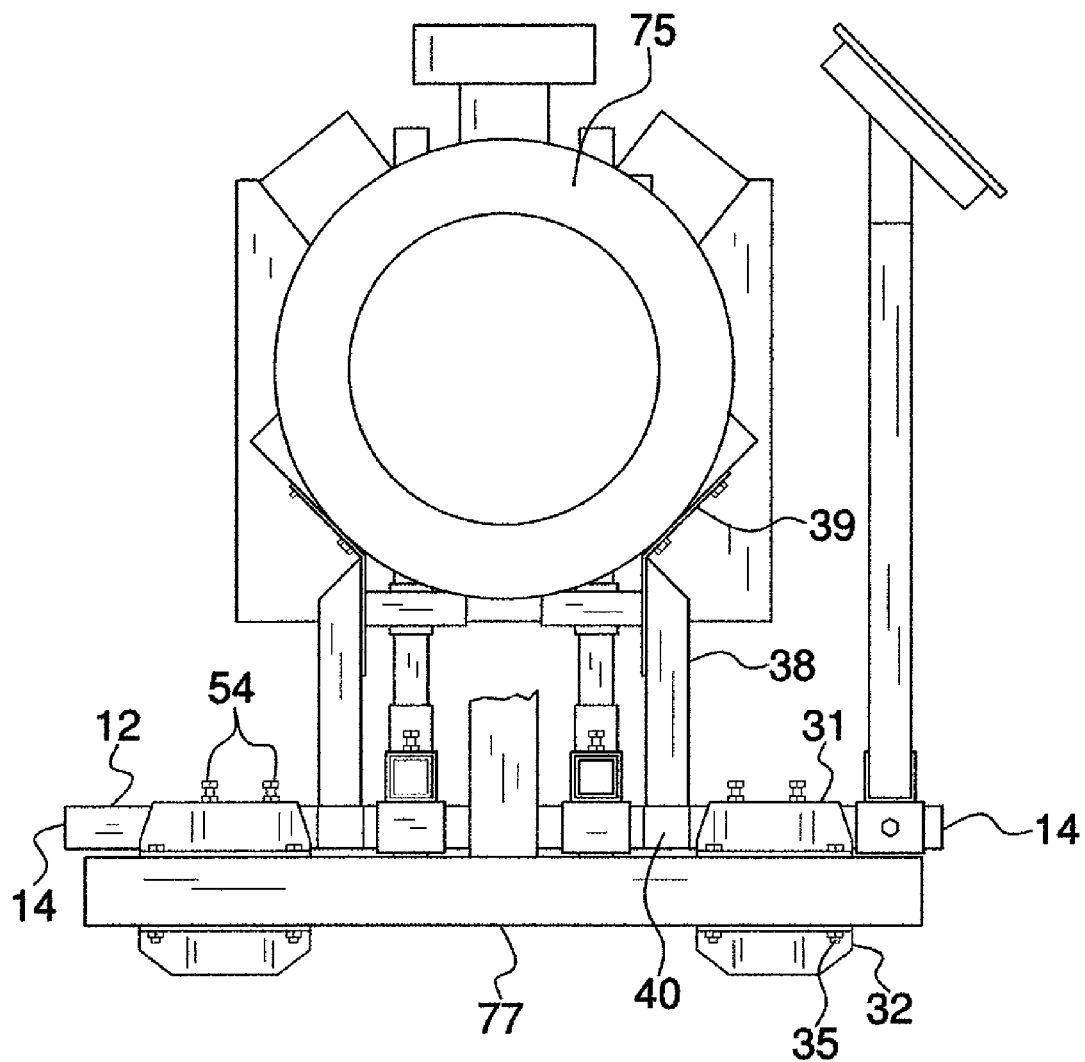
FIG. 6 is a front broken view of an embodiment of the disclosure.

A pair of receiving members 30 is positioned on the front support 12. Ends 78 of an engine hoist 77 are extendable into the receiving members 30 to stabilize the hoist 77 with respect to the front support 12. The receiving members 30 are slidable along the front support 12 to allow the receiving members to be adjusted to accommodate hoists 78 of varying sizes. The receiving members 30 each include an upper panel 31 and a lower panel 32. The upper panel 31 has a shape to conform to and cover a portion of an upper side of the front support 12. A pair of lips 33 extends outwardly from the upper panel 31. The lower panel 32 includes leg supports 34 to lift the lower panel 32 about equal to wheels 79 on the hoist. The lower supports of the hoist 77 are positioned between the lower panel 32 and the front support 12 as shown in FIG. 5. Couplers 35 are then extended through the lips 33 on the upper panel 31 and through the lower panel 32 securing the upper 31 and lower 32 panels together and to secure the hoist 77 to the front support 12.

A pair of post members 36 is provided. Each of the vertical mounts 28 removably receive one of the post members 36 and secure the post members 36 to an associated one of the lateral supports 22. The post members 36 extend upwardly from the lateral supports 22. Each of a pair of engine supports 38 includes a top end 39 and bottom end 40. The bottom ends 39 comprise tubes slidably positioned on the front support 12 to allow selective positioning of the engine supports 38 on the front support 12. The top ends 40 of the engine supports 38 are abuttable against an engine 75 to hold the engine 75 above the front support 12. The top end 40 of each of the engine supports 38 comprises a plate that has at least one aperture 41 extending therethrough. The plate, or top end 40, of each of the engine supports is angled with respect to a horizontal plane. The plates 40 cradle the engine 75 between the engine supports 38 and the apertures 41 allow for fasteners to be extended through the plates 40 and into the engine 75 to further stabilize the engine 75.

A pair of lower supports 42 and a pair of upper supports 44 is provided. Each of the post members 36 has one of the lower supports 42 positioned thereon. The lower supports 42 are vertically adjustable on the post members 36. Each of the lower supports 42 includes a flange 43 engageable with the engine 75 or a radiator 74 on the engine 75. Each of the post members 36 has one of the upper supports 44 positioned thereon. The upper supports 44 are positioned above the lower supports 42 and are engageable with the engine 75 or radiator 74 to stabilize the engine 75.

In use, when an engine 75 needs to be tested or broken in, the engine 75 may be positioned on the assembly 10 as described above and shown in the Figures. The assembly 10 allows the engine 75 to be tested while running without having to place the engine 75 within a vehicle frame and can be done directly from the engine hoist 77 to allow for ease of testing and transportation of the engine 75. The assembly 70 may include a test monitor mounting arm 50 which is removably mounted on the front support 12 to hold a monitor 52 which can be operationally coupled to the engine 75 to monitor engine functionality and performance parameters. When not being used, the assembly 10 is disassembled into its constituent parts to allow for easy storage and transportation of the assembly. A plurality of fasteners 54 is included in the assembly 10 to secure together and lock down its movable and removable parts.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. An engine test assembly for engaging an engine hoist and supporting an engine while it is being run, said assembly including:
    an elongated and horizontally orientated front support having a pair of opposite ends;
    a pair of coupling sleeves being mounted on said front support;
    a pair of elongated and horizontally orientated lateral supports, each of said lateral supports having a first end and a second end, each of said coupling sleeves receiving one of said first ends of said lateral supports;
    a pair of receiving members being positioned on said front support, ends of the hoist being extendable into said receiving members to stabilize the hoist with respect to the front support;
    a pair of vertical mounts, each of said second ends having one of said vertical mounts attached thereto;
    a pair of post members, each of said vertical mounts receiving one of said post members and securing said post members to an associated one of said lateral supports;
    a pair of engine supports each including a top end and bottom end, said bottom ends engaging said front support, said top ends of said engine supports being abuttable against the engine to hold the engine above said front support; and
    a pair of lower supports, each of said post members having one of said lower supports positioned thereon, each of said lower supports including a flange engageable with the engine or a radiator on the engine.

2. The assembly according to claim 1, each of said coupling sleeves including a sleeve portion and a coupler portion, said sleeve portions being positioned above said front support, said coupler portions being selectively positioned on said front support to allow a distance between said coupling sleeves to be adjusted.

3. The assembly according to claim 1, wherein a distance from said second ends to said front support is selectively adjustable.

4. The assembly according to claim 1, wherein said bottom ends comprise tubes slidably positioned on said front support to allow selective positioning of said engine supports on said front support, said top end of each of said engine supports comprising a plate having at least one aperture extending therethrough, said plate of each of said engine supports being angled with respect to a horizontal plane, said plates cradling the engine between said engine supports.

5. The assembly according to claim 1, wherein said lower supports are vertically adjustable on said post members.

6. The assembly according to claim 5, further including a pair of upper supports, each of said post members having one of said upper supports positioned thereon, said upper supports being positioned above said lower supports and being engageable with the engine or radiator to stabilize the engine.

7. An engine test assembly for engaging an engine hoist and supporting an engine while it is being run, said assembly including:
    an elongated and horizontally orientated front support having a pair of opposite ends;
    a pair of coupling sleeves being mounted on said front support, each of said coupling sleeves including a sleeve portion and a coupler portion, said sleeve portions being positioned above said front support, said coupler portions being selectively positioned on said front support to allow a distance between said coupling sleeves to be adjusted;
    a pair of elongated and horizontally orientated lateral supports, each of said lateral supports having a first end and a second end, each of said coupling sleeves receiving one of said first ends to align said lateral supports parallel with each other and perpendicular to said front support, a distance from said second ends to said front support being selectively adjustable;
    a pair of receiving members being positioned on said front support, ends of the hoist being extendable into said receiving members to stabilize the hoist with respect to the front support;
    a pair of vertical mounts, each of said second ends having one of said vertical mounts attached thereto, each of said vertical mounts comprising a tube;
    a pair of post members, each of said vertical mounts removably receiving one of said post members and securing said post members to an associated one of said lateral supports, said post members extending upwardly from said lateral supports;
    a pair of engine supports each including a top end and bottom end, said bottom ends comprising tubes slidably positioned on said front support to allow selective positioning of said engine supports on said front support, said top ends of said engine supports being abuttable against the engine to hold the engine above said front support, said top end of each of said engine supports comprising a plate having at least one aperture extending therethrough, said plate of each of said engine supports being angled with respect to a horizontal plane, said plates cradling the engine between said engine supports;

a pair of lower supports, each of said post members having one of said lower supports positioned thereon, said lower supports being vertically adjustable on said post members, each of said lower supports including a flange engageable with the engine or a radiator on the engine; and a pair of upper supports, each of said post members having one of said upper supports positioned thereon, said upper supports being positioned above said lower supports and being engageable with the engine or radiator to stabilize the engine.

* * * * *